3,334,062
PROCESS FOR RENDERING INORGANIC
POWDERS HYDROPHOBIC
Eric D. Brown and James Franklin Hyde, Midland, Mich., assignors to Dow Corning Corporation, Midland, Mich., a corporation of Michigan
No Drawing. Filed Mar. 1, 1965, Ser. No. 436,293
17 Claims. (Cl. 260—37)

This application relates to a new process for rendering inorganic powders hydrophobic. This process finds special utility in the production of hydrophobic silica fillers for silicone and polyurethane elastomers. The elastomers that contain fillers produced by the process of this invention exhibit improvements in physical properties and heat stability over corresponding silicone and polyurethane elastomers that contain commercially known silica fillers.

The process of this invention comprises contacting at a temperature of 15° to 170° C.

(a) a finely-divided, nonhydrophobic, inorganic material containing at least $y/220$ weight percent of adsorbed water, based on the weight of (a), with
(b) at least $y/50$ weight percent, based on the weight of (a), of a cyclic siloxane of the formula $(R_2SiO)_3$, in the presence of
(c) at least 0.2 mol percent, based on the moles of (a) present, of a catalyst selected from the group consisting of ammonium hydroxide, ammonium carbonate, $NH_4X$

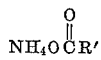

$NR''_3$, and combinations thereof, where R is selected from the group consisting of monovalent hydrocarbon, monovalent beta-fluoroalkylethyl $(C_nF_{2n}CH_2CH_2-)$ where $n$ is an integer, and monovalent haloaryl radicals, $y$ is the surface area of (a) in square meters per gram, X is selected from the group consisting of chlorine and flourine, R' is selected from the group consisting of hydrogen, methyl, and ethyl, and R'' is selected from the group consisting of hydrogen and monovalent hydrocarbon radicals that have their valence bond on an aliphatic carbon atom, whereby (a) acquires hydrophobic properties.

It is preferred to practice this process with ingredient (a) consisting essentially of silica having a surface area of at least 100 square meters per gram.

The advantages of this process are significant. First, it is simple and rapid, as can be seen from the examples below. This process can be used to prepare hydrophobic silica in less than one day without heating, whereas the prior art teaches that the process of treating silica fillers with cyclic polysiloxanes at room temperature requires a minimum of 4 days (see U.S. Patent 3,004,859). Furthermore, the process of this invention can be performed in as little as two hours or less at temperatures as low as 50° C.

The treated silica of this invention makes a superior filler for silicone elastomers. First, it is less prone to "dusting" upon handling than many commercial, hydrophobic silica fillers. Second, silicone elastomers made from it frequently exhibit improved heat stability over silicone elastomers made from silica fillers that are treated with materials such as trimethylchlorosilane. This is believed to be caused by the fact that while trimethylsiloxy groups can enter the silicone polymer through high temperature rearrangement, acting as an endblocking group and therefore lowering the molecular weight of the polymer, the disubstituted siloxane units of the treated fillers of this invention cannot act as endblocking groups if they migrate to the silicone polymer since they have only two, not three, organic substituents. Third, the treated silica of this invention can be made more cheaply than the presently-used treated silicas. Fourth, polyurethane sealants which are filled with the treated silica of this invention exhibit a high extrudability coupled with a low "slumping" tendency—better than with other treated fillers.

Furthermore, the treated fillers of this invention exhibit a low water content, where untreated silica fillers can have an adsorbed water content in excess of 40 weight percent. The fillers of this invention are insensitive to changes in humidity, resulting in filled elastomers which have physical properties that are also insensitive to humidty.

The treated fillers of this invention also inhibit "crepe aging" of silicone elastomers in a superior manner. Crepe aging is a hardening of the unvulcanized silicone elastomer occuring on aging or storage, which makes the elastomer difficult to mill or mold.

Finally, the treated materials of this invention exhibit a superior and long-lasting hydrophobicity that can be eliminated only with time and difficulty, whereas many treated fillers, particularly the previously-known fillers which are treated with cyclic siloxanes, will lose their hydrophobicity if washed in a volatile organic solvent.

Only cyclotrisiloxanes are operative in the process of this invention. No advantage is obtained over the known process of treating silica fillers with cyclic siloxanes if another cyclic siloxane is substituted for the cyclotrisiloxanes used in the process of this invention.

Any finely-divided, nonhydrophobic, inorganic material that contains sufficient adsorbed water is suitable for use in the process of this invention, e.g. silica, powdered glass, alumina, titania, aluminum, asbestos, graphite, carbon black, barium sulfate, zinc oxide, ferric oxide, zinc sulfide, and silver chloride.

R can be any monovalent hydrocarbon radical e.g. alkyl radicals such as methyl, ethyl, isopropyl, tertiary-butyl, hexyl, octadecyl or myricyl; alkenyl radicals such as vinyl, allyl, methallyl, hexenyl, or butadienyl; cycloaliphatic radicals such as cyclopentyl, cyclobutyl and cyclohexenyl; aralkyl radicals such as benzyl and beta-phenylethyl; and aromatic hydrocarbon radicals such as phenyl, xenyl, tolyl, naphthyl and anthracyl. R can also be any beta-perfluoroalkylethyl radical such as 3,3,3-trifluoropropyl or $C_8F_{17}CH_2CH_2-$, and any haloaryl radical such as tetrachlorophenyl, pentabromoxenyl, and iodonaphthyl.

R'' can be hydrogen or any monovalent hydrocarbon radical that has the free valence bond on an aliphatic carbon atom, e.g. aliphatic radicals such as those shown for R above, and aralkyl radicals such as benzyl and 2-phenylpropyl.

It is preferred for the three ingredients to be uniformly mixed. There are two preferred methods for accomplishing this. One is to make a slurry of ingredients (a), (b) and (c) in an organic liquid such as toluene, hexane, dibutylether, cyclohexane, methylchloroform, methylene chloride, bromobenzene and the dimethylether of ethylene glycol, which facilitates the interspersing of the ingredients. The other is to contact the inorganic material with vapors of ingredients (b) and (c) while agitating the system. This latter method can be performed by in situ vaporization of ingredients (b) and/or (c) by heating or merely allowing the mixture of ingredients to stand.

Any method of contacting ingredients (a), (b) and (c) is, however, operative, though nonuniform mixing of the three ingredients may result in non-uniform hydrophobicity of the inorganic material.

The amount of catalyst that must be added is not critical so long as there is at least 0.2 mol percent, based on the mols of (a), except that one should keep in mind the fact that some inorganic materials can have acidic surfaces that will inactivate the catalyst (e.g. activated aluminum silicate). In this case, sufficient catalyst to neutralize the surface plus an excess for the catalytic function can be added.

The time required for the process of this invention to go to completion usually decreases with increasing catalyst concentration, especially when the adsorbed water content of (a) is high.

The adsorbed water content of (a) is measured with reference to an assumed 0 percent water point. Any sample of ingredient (a) can be put into this condition by azeotroping the sample for two hours in a toluene suspension. It is believed that the assumed 0 percent water content is very near to the actual 0 percent water state.

The percent of water adsorbed by the azeotroped material is then measured by the increase in weight of the given sample of ingredient (a).

In virtually every case where ingredient (a) has been exposed to a normally humid atmosphere for a few hours, its water content will be above the minimum required for this process. When ingredient (a) has too low a water content, it will not become as hydrophobic in the process of this invention as it would if it had a higher water content.

It is preferred for there to be essentially no liquid, unadsorbed water present in the reaction system.

It is preferred for ingredient (a) to contain from $y/190$ to $y/18$ weight percent of adsorbed water, and form at least $y/31$ weight percent of ingredient (b) to be present in the process of this invention, $y$ being the surface area of (a) as defined above and the percentages being based on the weight of (a).

The surface area ($y$) of the finely divided inorganic material is as measured by $N_2$ adsorption, using the modified "B.E.T." method disclosed by Nelson and Eggertsen in Anal. Chem. 30: 1387–90 (1958), using a Perkin Elmer Shell Sorptometer.

For a rapid process, it is preferred to run the process of this invention at a temperature of 40° to 110° C.

The preferred ingredients (c) are ammonium carbonate, ammonium formate, ammonia, and ammonium hydroxide.

The hydrophobic materials made by this invention are useful as fillers in silicone elastomers and resins and in other organic rubbers and plastics. Silicone and polyurethane sealants of extra low "slump" and high extrudability can be produced from the fillers of this invention.

Furthermore, materials like silica, alumina, titania, barium sulfate, and calcium carbonate can be made non-agglomerating in aqueous environments through the process of this invention.

The following examples are illustrative only and should not be construed as limiting the invention which is properly delineated in the appended claims.

*Example 1*

9 grams of hexamethylcyclotrisiloxane were added to 20 grams of powdered silica having a surface area of approximately 400 square meters per gram and an adsorbed water content of 2–4 weight percent in 530 ml. of toluene. Ammonia gas was bubbled through the mixture for 5 minutes.

The mixture was sealed in a container and agitated at about 25° C. for 144 hours. The mixture was then filtered, washed in toluene, and dried for 16 hours at 150° C. to remove solvent, catalyst, and excess cyclotrisiloxane. A hydrophobic silica was produced.

50 parts by weight of this treated silica were milled with 100 parts of a gum consisting primarily of dimethylsiloxane units, but containing 5.5 mol percent of diphenylsiloxane units and 0.142 mol percent of methylvinylsiloxane units, and 0.5 part by weight of tertiarybutylperbenzoate.

The composition was allowed to stand for 4 days without any sign of crepe aging. The composition was then cured for 10 minutes at 150° C. to form an elastomer. It was then further heated at 250° C..

The physical characteristics of the elastomer are shown below:

| Treatment | Shore "A" Durometer | Tensile (p.s.i.) | Elongation (Percent) | Tear Strength* (lb./in.) |
|---|---|---|---|---|
| 10 min. at 150° C | 42 | 1,570 | 890 | |
| 4 hr. at 250° C | 62 | 1,650 | 510 | 200 |
| 24 hr. at 250° C | 68 | 1,260 | 380 | 166 |

*This and the following tear strength tests are according to the procedure of ASTM D624–54, Die B.

*Example 2*

5 grams of hexamethylcyclotrisiloxane was added to 20 grams of powdered silica having a surface area of approximately 200 square meters per gram and an adsorbed water content of 1 to 2 weight percent in 530 ml. of toluene. Ammonia gas was bubbled through the mixture for 5 minutes.

This mixture was processed and formulated in the manner of Example 1 to yield first a hydrophobic silica and then an elastomer with the following properties:

| Treatment | Shore "A" Durometer | Tensile (p.s.i.) | Elongation (Percent) | Tear Strength (lb./in.) |
|---|---|---|---|---|
| 10 min. at 150° C | 43 | 1,400 | 660 | |
| 4 hr. at 250° C | 56 | 1,560 | 490 | 152 |
| 24 hr. at 250° C | 61 | 1,350 | 370 | 132 |

*Example 3*

The process of Example 1 was twice repeated, using 50 grams of the silica of Example 1, 520 ml. of toluene, plus in one case 7.5 grams and in the other 5 grams of hexamethylcyclotrisiloxane.

The ammonia was bubbled for 5 minutes and the slurries agitated for 72 hours each to yield hydrophobic silicas.

The silicone rubbers which were formed from these silicas in the manner of Example 1, were non-crepe aging and had physical properties that were similar to the rubbers of Examples 1 and 2.

*Example 4*

The process of Example 1 was repeated, using 20 parts by weight of hexamethylcyclotrisiloxane per 100 parts of silica, and agitating the mixture for 8 hours before filtering, yielding a hydrophobic silica.

The physical properties of the elastomer produced were:

| Treatment | Shore "A" Durometer | Tensile (p.s.i.) | Elongation (Percent) | Tear Strength (lb./in.) |
|---|---|---|---|---|
| 10 min. at 150° C | 56 | 1,610 | 750 | |
| 4 hr. at 250° C | 76 | 1,340 | 310 | 158 |
| 24 hr. at 250° C | 82 | 940 | 200 | 94 |

This process was again repeated, agitating the silica-siloxane-ammonia mixture for 26½ hours before filtering to obtain a hydrophobic silica.

The physical properties of the elastomer produced were:

| Treatment | Shore "A" Durometer | Tensile (p.s.i.) | Elongation (Percent) | Tear Strength (lb./in.) |
|---|---|---|---|---|
| 10 min. at 150° C | 47 | 1,550 | 860 | |
| 4 hr. at 250° C | 72 | 1,460 | 400 | 239 |
| 24 hr. at 250° C | 75 | 1,080 | 270 | 111 |

Example 5

To 100 parts by weight of the powdered silica of Example 1 there was added 18 parts of hexamethylcyclotrisiloxane and 3 parts of ammonium carbonate. The mixture was placed in a closed container and agitated at room temperature (~23° C.) for about 15 hours to yield a hydrophobic, treated silica.

To 50 parts by weight of this treated filler there was added 103 parts of a dimethylpolysiloxane gum containing about 0.6 mol percent of methylvinylsiloxane units, 1.5 parts of dichlorobenzoyl peroxide, and 3 parts of ceric hydrate paste.

This was cured for 3 hours at 177° C. to form an elastomer.

Samples of this elastomer were further heated to yield elastomers with the following properties:

| Treatment | Shore "A" Durometer | Tensile (p.s.i.) | Elongation (percent) | Tear Strength (lb./in.) | Bashore Resilience* |
|---|---|---|---|---|---|
| 4 hr. at 200° C | 48 | 1,760 | 580 | 179 | 46 |
| 24 hr. at 250° C | 53 | 1,320 | 400 | 133 | 44 |

*The resilience test is performed on a Bashore Resiliometer, sold by The Precision Scientific Company of Chicago. The recommended procedure was used, which involves dropping a weight on a piece of the elastomer to be tested which is about 7/16 inch thick. The resilience is measured by the rebound, expressed as a percentage of the height the weight fell.

Example 6

To 100 parts by weight of powdered silica having a surface area of about 400 square meters per gram and a 2 to 4 weight percent water content there was added 20 parts by weight of tris(3,3,3-trifluoropropyl)trimethylcyclotrisiloxane, and this was exposed to a jet of ammonia for 5 minutes.

This mixture was sealed in a bottle and agitated for 64 hours at about 23° C. to yield a hydrophobic silica.

To 50 parts by weight of the above treated silica there was added 100 parts by weight of a 3,3,3-trifluoropropylmethylpolysiloxane gum containing 0.5 mol percent of methylvinylsiloxane units, and 2.5 parts of a dispersion of 2,4-dichlorobenzoyl peroxide in dimethylpolysiloxane.

This was heated for 10 minutes at 150° C. to form an elastomer having the following properties:

| Treatment | Shore "A" Durometer | Tensile (p.s.i.) | Elongation (Percent) | Tear Strength (lb./in.) |
|---|---|---|---|---|
| 10 min. at 150° C | 52 | 1,730 | 380 | |
| 24 hr. at 150° C | 61 | 1,980 | 280 | 103 |
| 24 hr. at 250° C | 68 | 1,380 | 170 | |

Example 7

Into each of four bottles there was placed 100 parts by weight of silica powder having a surface area of 400 square meters per gram and an adsorbed water content of 2 to 4 weight percent, plus 15 parts of hexamethylcyclotrisiloxane. A jet of ammonia gas was stirred into these mixtures for 1 minute, and the bottles were promptly sealed.

The four bottles were heated at (a) 50°, (b) 90°, (c) 125°, and (d) 150° C. respectively for one hour.

Silica samples from each bottle were placed into the toluene phase of 2-phase systems of toluene and 28 percent ammonium hydroxide. The silica rested in the toluene phase at the interface with the aqueous ammonia, indicating that all four silica samples possessed hydrophobic properties.

After 2¼ hours, samples (a) and (b) still remained in the toluene phase. About one-half of sample (c) and two-thirds of sample (d) had passed into the aqueous ammonia phase, indicating that they had partly lost their hydrophobicity.

The experiment concerning (c) and (d) was repeated, adding 5 weight percent of water based on the weight of the silica. Improved hydrophobicity of the products were obtained, indicating that a higher water content on the silica improved the effectiveness of the hydrophobing process at higher temperatures.

Example 8

The experiments of this example illustrate the criticality of the use of a cyclotrisiloxane and a catalyst in the process of this invention.

(a) To 100 parts by weight of powdered silica having a surface area of about 400 squire meters per gram and an adsorbed water content of about 2 to 4 weight percent, there was added 27 parts by weight of octamethylcyclotetrasiloxane and sufficient toluene to make a slurry containing about 11 weight percent solids. This slurry was bubbled with ammonia gas for 1½ minutes to saturate the slurry, and it was then sealed in a container.

The container was then agitated and allowed to stand at room temperature (~23° C.) for 4 days.

The treated silica was subjected to the toluene test of Example 7. The silica immediately passed into the aqueous ammonia phase, indicating that it was not hydrophobic.

This result can be compared with the experiment of Example 9.

(b) To 25 grams of powdered silica having a surface area of about 400 square meters per gram and an adsorbed water content of about 4 weight percent there were added 3.75 grams of hexamethylcyclotrisiloxane.

This mixture was sealed in a bottle and rolled at 40 to 50° C. for 4 hours and 45 minutes. A sample of the mixture was then subjected to the toluene test of Example 7, and was found to immediately pass into the aqueous ammonia phase, indicating that it was hydrophilic.

The rest of the mixture was allowed to stand in the sealed bottle for seven days. Another sample was then taken, and found to be still entirely hydrophilic by the toluene test. This can be compared with Example 10.

Example 9

To 100 parts by weight of powdered silica having a surface area of about 400 square meters per gram and an adsorbed water content of about 2 to 4 weight percent there was added 30 parts of hexamethylcyclotrisiloxane, 4.5 parts of 23% ammonium hydroxide solution, and sufficient toluene to make a slurry containing about 11 weight percent solids.

The slurry was sealed in a container, agitated, and allowed to stand at room temperature (~23° C.) for 18 hours.

The treated silica was subjected to the toluene test of Example 7. The silica remained entirely in the toluene phase for 12 days, indicating that it was strongly hydrophobic.

Example 10

To 100 parts by weight of powdered silica with a surface area of 400 square meters per gram and an adsorbed water content of 2 to 4 weight percent, there was added 15 parts by weight of hexamethylcyclotrisiloxane and 1 part of ammonium carbonate.

This mixture was sealed in a bottle, and was rolled and heated by a heat lamp at about 42° C. for 4 hours.

The bottle was opened and a sample taken at the end of each of the 4 hours.

Each sample was tested with the toluene test of Example 7. The samples were checked after 14 days in the toluene-aqueous ammonia mixture.

Half of the sample which had been removed after one hour remained in the toluene phase. Three quarters of the sample which had been removed after two hours remained in the toluene phase. All of the three and four hour samples remained in the toluene, and continued to remain there for 1½ months thereafter.

*Example 11*

The experiment of Example 10 was repeated, substituting a one minute exposure to a jet of ammonia gas for the ammonium carbonate.

In this case, a sample removed after 2 hours of agitation and heating remained in the toluene phase for two months when subjected to the toluene test of Example 7.

*Example 12*

To 100 parts by weight of powdered silica having a surface area of 400 square meters per gram and an adsorbed water content of 2 to 4 weight percent there was added 20 parts of hexamethylcyclotrisiloxane and 4 parts of a catalyst. Four samples were prepared, each containing a different catalyst.

These mixtures were sealed and rolled for 2½ days. The catalyst and unadsorbed cyclotrisiloxane were then removed by heating the treated silica at 150° C. for 4 hours.

The catalysts used in the four samples were isopropylamine, diisopropylamine, dipropylamine, and tripropylamine.

The four samples were subjected to the toluene test of Example 7. The treated silicas all remained in the toluene phase for a minimum of one month, indicating that they were strongly hydrophobic.

*Example 13*

To 100 parts by weight of the powdered silica of Example 12 there was added 20 parts of hexamethylcyclotrisiloxane and 4 parts of a catalyst.

Two samples of this mixture were prepared; in sample (a) the catalyst was ammonium chloride, and in sample (b) the catalyt was ammonium acetate.

The two samples were sealed in a bottle and rolled at room temperature (23° C.) for 2½ days.

Following this, a portion of each sample was tested in the toluene test of Example 7. After 9 days, about ⅓ of the silica of sample (a) had passed into the aqueous ammonium phase. The silica of sample (b) remained entirely in the toluene phase at the end of 30 days.

*Example 14*

To 100 parts by weight of the silica of Example 12 there was added 20 parts of hexamethylcyclotrisiloxane and 2 parts of ammonium fluoride catalyst.

This was sealed in a bottle and rolled at 40 to 50° C. for 2¼ hours. The bottle was then opened and heated at 150° C. for 6 hours to remove the catalyst.

The treated silica was subjected to the toluene test of Example 7. All of the silica remained in the toluene phase for at least 1 month.

*Example 15*

Equivalent results are obtained when 100 grams of finely-divided silica, alumina, graphite, aluminum, or barium sulfate, which have been exposed to warm, humid air for 10 hours, are heated with agitation for 8 hours at 60° C. with 25 grams of sym-tridodecyltrimethylcyclotrisiloxane and 4 grams of ammonium formate.

*Example 16*

To 25 grams of powdered silica having a surface area of about 400 square meters per gram and an adsorbed water content of 23 weight percent there was added 5 grams of hexamethylcyclotrisiloxane and sufficient toluene to make an 11 percent solids dispersion.

Ammonia gas was bubbled through this mixture for 3 minutes. Then the mixture was sealed in a container and allowed to stand for 17 hours.

A sample of treated silica was then removed and subjected to the toluene test of Example 7. All of the treated silica initially remained in the toluene phase, but after two days, one-half of the silica had passed to the aqueous ammonia phase.

The rest of the treated silica mixture was allowed to stand for 2½ days. Another sample was again subjected to the toluene test; all of the sample remained in the toluene phase for at least two weeks, indicating strong hydrophobicity.

*Example 17*

To 100 grams of the silica of Example 12 there was added 27.6 g. of sym-triphenyltrimethylcyclotrisiloxane and 1 g. of ammonium carbonate.

This mixture was sealed in a bottle and agitated for 19 hours; then it was heated at 40 to 50° C. and further agitated for 2 hours.

The treated silica product was subjected to the toluene test of Example 7, and remained entirely in the toluene phase for 3 days, indicating that it was strongly hydrophobic.

The treated silica was mixed with a dimethylsiloxane gum. No crepe aging was noted after 2 days.

*Example 18*

To 100 parts by weight of the silica of Example 12 there was added 30 parts by weight of hexaphenylcyclotrisiloxane and sufficient toluene to make an 11 percent solids dispersion.

Ammonia gas was bubbled through the dispersion for one minute to saturate it, and the dispersion was sealed in a container and allowed to stand for 10 days.

On subjection to the toluene test of Example 7, the treated silica remained in the toluene layer for several hours.

*Example 19*

To 50 grams of the silica of Example 12 there was added 11.6 grams of sym-trimethyltrivinylcyclotrisiloxane and sufficient toluene to make an 11 percent solids dispersion.

Ammonia gas was bubbled through the dispersion for one minute to saturate it, and the dispersion was sealed in a container and allowed to stand for 2 days at room temperature. The treated silica was then filtered out and dried at 150° C. for 3 hours.

The treated silica remained in the toluene layer for over 5 days when subjected to the toluene test of Example 7.

The treated silica was mixed with a dimethylsiloxane gum. Little crepe-aging was noted after two days.

*Example 20*

When 50 grams of powdered silica having a surface area of 100 square meters per gram and an adsorbed water content of 1 weight percent is heated for 4 hours at 70° C. in the presence of 5 grams of ammonium propionate, 15 grams of benzyldecylamine, and 20 grams of any or all of the following cyclotrisiloxanes, a hydrophobic silica is obtained:

(a) Sym-tris(cyclohexyl)triethylcyclotrisiloxane.
(b) Sym-tris(dibromophenyl)trimethylcyclotrisiloxane.
(c) 1,1-bis(beta-phenylpropyl)2,3 - diallyldimethylcyclotrisiloxane.

Example 21

A good silicone elastomer was formulated from 60 g. of the silica of Example 12 which had been treated with 60 g. of hexamethylcyclotrisiloxane in the presence of n-hexylamine.

That which is claimed is:

1. The process comprising contacting at a temperature of 15° to 170° C.
   (a) a finely-divided, nonhydrophobic, inorganic material containing at least $y/220$ weight percent of adsorbed water, based on the weight of (a), with
   (b) at least $y/50$ weight percent, based on the weight of (a), of a cyclic siloxane of the formula $(R_2SiO)_3$, in the presence of
   (c) at least 0.2 mol percent, based on the moles of (a) present, of a catalyst selected from the group consisting of ammonium hydroxide, ammonium carbonate, $NH_4X$,

$NR''_3$, and combinations thereof, where
   R is selected from the group consisting of monovalent hydrocarbon, monovalent beta-fluoroalkylethyl, and monovalent haloaryl radicals,
   $y$ is the surface area of (a) in square meters per gram,
   X is selected from the group consisting of chlorine and fluorine,
   R' is selected from the group consisting of hydrogen, methyl, and ethyl, and
   R'' is selected from the group consisting of hydrogen and monovalent hydrocarbon radicals that have their valence bond on an aliphatic carbon atom, whereby (a) acquires hydrophobic properties.

2. The process of claim 1 where (a) consists essentially of silica having a surface area of at least 100 square meters per gram.

3. The product made by the process of claim 2.

4. The process of claim 1 where (b) is at least partly in the vapor phase during the operation of the process.

5. The process of claim 1 where said process is performed while (a), (b) and (c) are in the presence of sufficient inert, organic liquid to form a slurry.

6. The process of claim 1 where (b) is hexamethylcyclotrisiloxane.

7. The process of claim 1 where (b) is trimethyltriphenylcyclotrisiloxane.

8. The process of claim 1 wherein (b) is tris-3,3,3-trifluoropropyltrimethylcyclotrisiloxane.

9. The process of claim 1 where (c) is ammonium carbonate.

10. The process of claim 1 where (c) is an aqueous ammonium hydroxide solution.

11. The process of claim 1 where (c) is ammonium formate.

12. The process of claim 1 where (c) is ammonia.

13. The process of claim 1 where from 0.5 to 10 mol percent of catalyst (c), base on the moles of (a), is present.

14. The process of claim 1 where essentially no unadsorbed liquid water is present during the operation of said process.

15. The process of claim 2 where essentially no unadsorbed liquid water is present during the operation of said process.

16. A silicone elastomer containing as a filler the product made by the process of claim 2.

17. The process of claim 1 where (b) is trimethyltrivinylcyclotrisiloxane.

References Cited

UNITED STATES PATENTS

| | | | |
|---|---|---|---|
| 2,615,006 | 10/1952 | Lane | 106—308 |
| 2,891,875 | 6/1959 | Phreaner | 106—308 |
| 3,004,859 | 10/1961 | Lichtenwalner | 106—308 |
| 3,024,126 | 3/1962 | Brown | 160—308 |

TOBIAS E. LEVOW, *Primary Examiner.*

J. E. POER, *Assistant Examiner.*